(12) United States Patent
Liao et al.

(10) Patent No.: US 11,733,581 B2
(45) Date of Patent: Aug. 22, 2023

(54) REFLECTIVE DISPLAY

(71) Applicant: E Ink Holdings Inc., Hsinchu (TW)

(72) Inventors: Ching-Huan Liao, Hsinchu (TW);
Yi-Yu Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/445,953

(22) Filed: Aug. 26, 2021

(65) Prior Publication Data

US 2022/0342272 A1 Oct. 27, 2022

(30) Foreign Application Priority Data

Apr. 23, 2021 (TW) ................................ 110114702

(51) Int. Cl.
*G02F 1/1677* (2019.01)
*G02F 1/1685* (2019.01)
*G02F 1/1335* (2006.01)
*G02F 1/13357* (2006.01)
*G02F 1/167* (2019.01)

(52) U.S. Cl.
CPC ...... *G02F 1/1677* (2019.01); *G02F 1/133514* (2013.01); *G02F 1/133621* (2013.01); *G02F 1/1685* (2019.01); *G02F 1/167* (2013.01)

(58) Field of Classification Search
CPC ............ G02F 1/1677; G02F 1/133514; G02F 1/133621; G02F 1/1685
USPC ........................................................ 349/70
See application file for complete search history.

(56) References Cited

U.S. PATENT DOCUMENTS

| 9,530,944 | B2 | 12/2016 | Jacobson et al. |
| 9,702,524 | B2 | 7/2017 | Jacobson et al. |
| 10,026,876 | B2* | 7/2018 | Hosokawa ............ H01L 33/504 |
| 10,187,954 | B2 | 1/2019 | Matsubayashi et al. |
| 10,711,191 | B2 | 7/2020 | Fiedler et al. |
| 11,296,056 | B2* | 4/2022 | Moon ..................... H01L 33/62 |
| 2014/0367713 | A1 | 12/2014 | Zhang et al. |
| 2017/0097458 | A1* | 4/2017 | Kimura ............. G02F 1/133514 |

(Continued)

FOREIGN PATENT DOCUMENTS

| CN | 108048079 A | 5/2018 |
| CN | 110491982 B | 12/2020 |

(Continued)

OTHER PUBLICATIONS

Corresponding Taiwan office action dated Jun. 21, 2022.

*Primary Examiner* — Charles S Chang
(74) *Attorney, Agent, or Firm* — CKC & Partners Co., LLC

(57) ABSTRACT

A light source device is used to generate illumination light and includes a plurality of light emitting components, at least one first fluorescent part, and at least one second fluorescent part. Each light emitting component is used to emit light. The first fluorescent part is disposed on at least one of the light emitting components and able to convert the light to first white light having a first color temperature. The second fluorescent part is disposed on at least one of the other light emitting components and able to convert the light to second white light having a second color temperature. The illumination light includes the first white light and the second white light, where the maximum difference between the first color temperature and the second color temperature is greater than or equal to 2000K.

9 Claims, 6 Drawing Sheets

(56) References Cited

U.S. PATENT DOCUMENTS

2018/0157120 A1\* 6/2018 Okamoto .......... G02F 1/133603
2020/0303598 A1\* 9/2020 Kim ................... H01L 25/0753

FOREIGN PATENT DOCUMENTS

TW 201024595 A 7/2010
TW 201929270 A 7/2019

\* cited by examiner

REFLECTIVE DISPLAY

CROSS-REFERENCE TO RELATED APPLICATION

This application claims priority to Taiwan Application Serial Number 110114702, filed Apr. 23, 2021, which is herein incorporated by reference in its entirety.

BACKGROUND

Technical Field

The present disclosure relates to a display, a light source device, and a light source thereof. More particularly, the present disclosure relates to a reflective display, a light source device, and a white light source thereof.

Description of Related Art

A conventional reflective display usually includes a front light module and a reflective display panel, in which the front light module can emit white light and illuminate the display surface of the reflective display panel with the white light, so as to help to display images. The color temperature of the white light has a certain degree of influence on images, especially color images. The color temperature of the white light can affect the color images a lot. Hence, when the front light module emits white light with an appropriate color temperature, it will help to maintain or improve the image quality of the reflective display.

SUMMARY

At least one embodiment of the disclosure provides a light source device, so as to supply appropriate white light to a reflective display.

Another embodiment of the disclosure provides a white light source, which is used for the previous light source device.

Another embodiment of the disclosure provides a reflective display, which includes the previous light source device.

A light source device according to at least one embodiment of the disclosure is used to generate illumination light and includes a plurality of light emitting components, at least one first fluorescent part, and at least one second fluorescent part. Each of the light emitting components is used to emit light. The first fluorescent part is disposed on at least one of the light emitting components and used for converting the light to a first white light, in which the first white light has a first color temperature. The second fluorescent part is disposed on at least one of the light emitting components and used for converting the light to a second white light, in which the second white light has a second color temperature. The illumination light includes the first white light and the second white light. A maximum difference between the first color temperature and the second color temperature is greater than or equal to 2000K.

A white light source according to at least one embodiment of the disclosure includes the light emitting components, the green fluorescent material, the first red fluorescent material and the second red fluorescent material. The light emitting components are used to emit the light, in which the light has the first color temperature after passing through the green fluorescent material and the first red fluorescent material, and the light has the second color temperature after passing through the green fluorescent material and the second red fluorescent material. A maximum difference between the first color temperature and the second color temperature is greater than or equal to 2000K.

A reflective display according to at least one embodiment of the disclosure includes a reflective display panel and a light source device. The light source device is used to generate the illumination light entering the reflective display panel. The light source device includes the light emitting components, the first fluorescent part and the second fluorescent part.

A reflective display according to another embodiment of the disclosure includes the reflective display panel and the light source device. The light source device is used to generate the illumination light entering the reflective display panel. The light source device includes the light emitting components and a plurality of fluorescent parts. The fluorescent parts are disposed on the light emitting components respectively, and each of the fluorescent parts includes the green fluorescent material, the first red fluorescent material and the second red fluorescent material.

Based on the above, by using at least one fluorescent part (e.g., the fluorescent part, or both the first fluorescent part and the second fluorescent part), the appropriate illumination light applied for the reflective display can be generated, thereby maintaining or improving the image quality.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 1B is a schematic cross-sectional view taken along a line 1B-1B in

FIG. 1A.

DETAILED DESCRIPTION

Figure 1A:
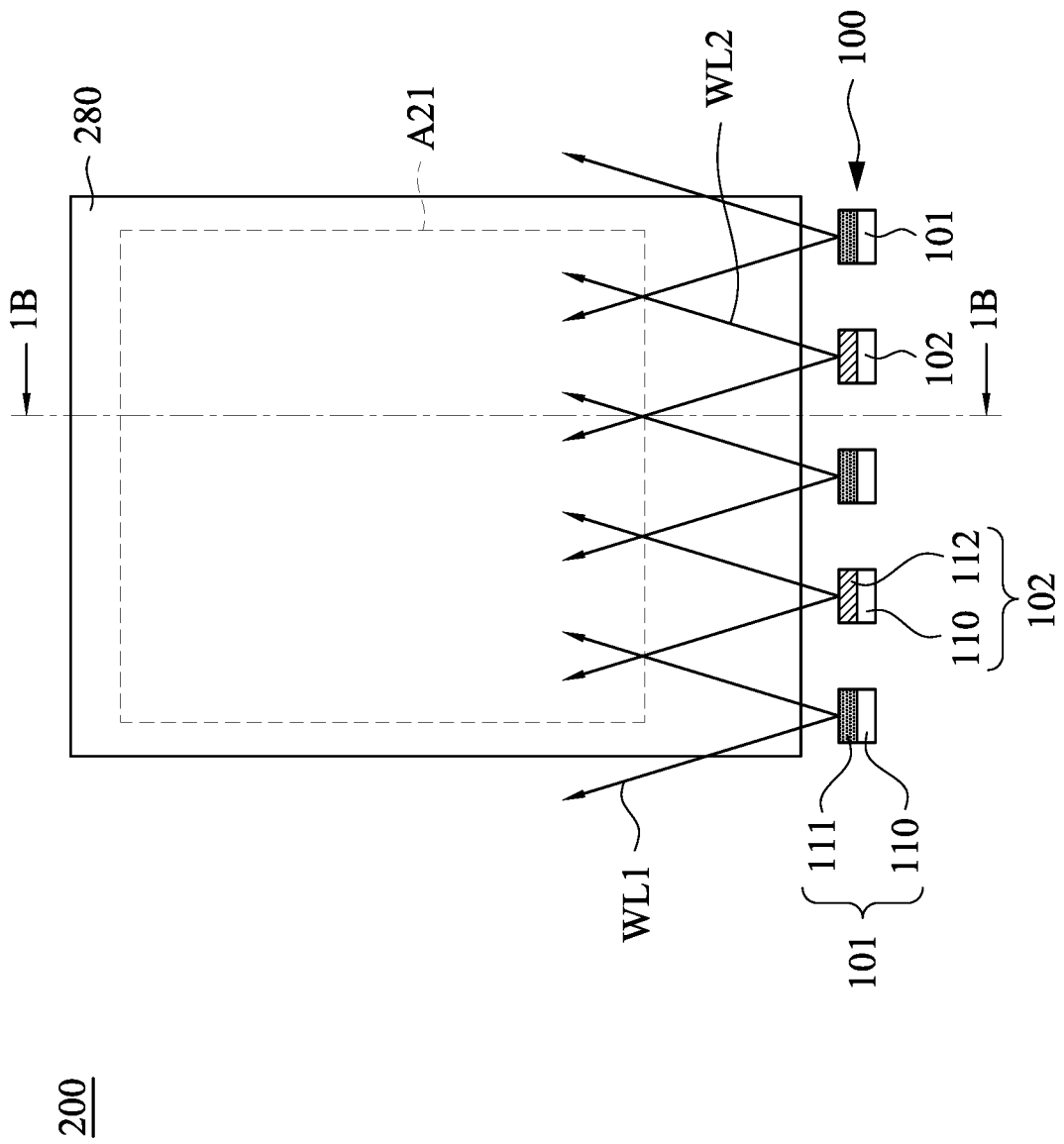
FIG. 1A is a schematic top view of a reflective display according to at least one embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

In the following description, in order to clearly present the technical features of the present disclosure, the dimensions (such as length, width, thickness, and depth) of elements (such as layers, films, substrates, and areas) in the drawings will be enlarged in unusual proportions. Accordingly, the description and explanation of the following embodiments are not limited to the sizes and shapes of the elements presented in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case which are mainly for illustration are intended neither to accurately depict the actual shape of the elements nor to limit the scope of patent applications in this case.

Moreover, the words, such as "about", "approximately", or "substantially", appearing in the present disclosure not only cover the clearly stated values and ranges, but also include permissible deviation ranges as understood by those with ordinary knowledge in the technical field of the disclosure. The permissible deviation range can be caused by the error generated during the measurement, where the error is caused by such as the limitation of the measurement system or the process conditions. For example, two objects (e.g., the planes or traces of two substrates) are "substantially parallel" or "substantially perpendicular", where "substantially parallel" and "substantially perpendicular" mean that the parallelism and the perpendicularity respectively between the two objects may include non-parallelism and non-perpendicularity due to the permissible deviation.

In addition, "about" may be expressed within one or more standard deviations of the values, such as within ±30%, ±20%, ±10%, or ±5%. The word "about", "approximately" or "substantially" appearing in this text can choose an acceptable deviation range or a standard deviation according to optical properties, etching properties, mechanical properties or other properties, not just one standard deviation to apply all the optical properties, etching properties, mechanical properties and other properties.

Figure 1B:
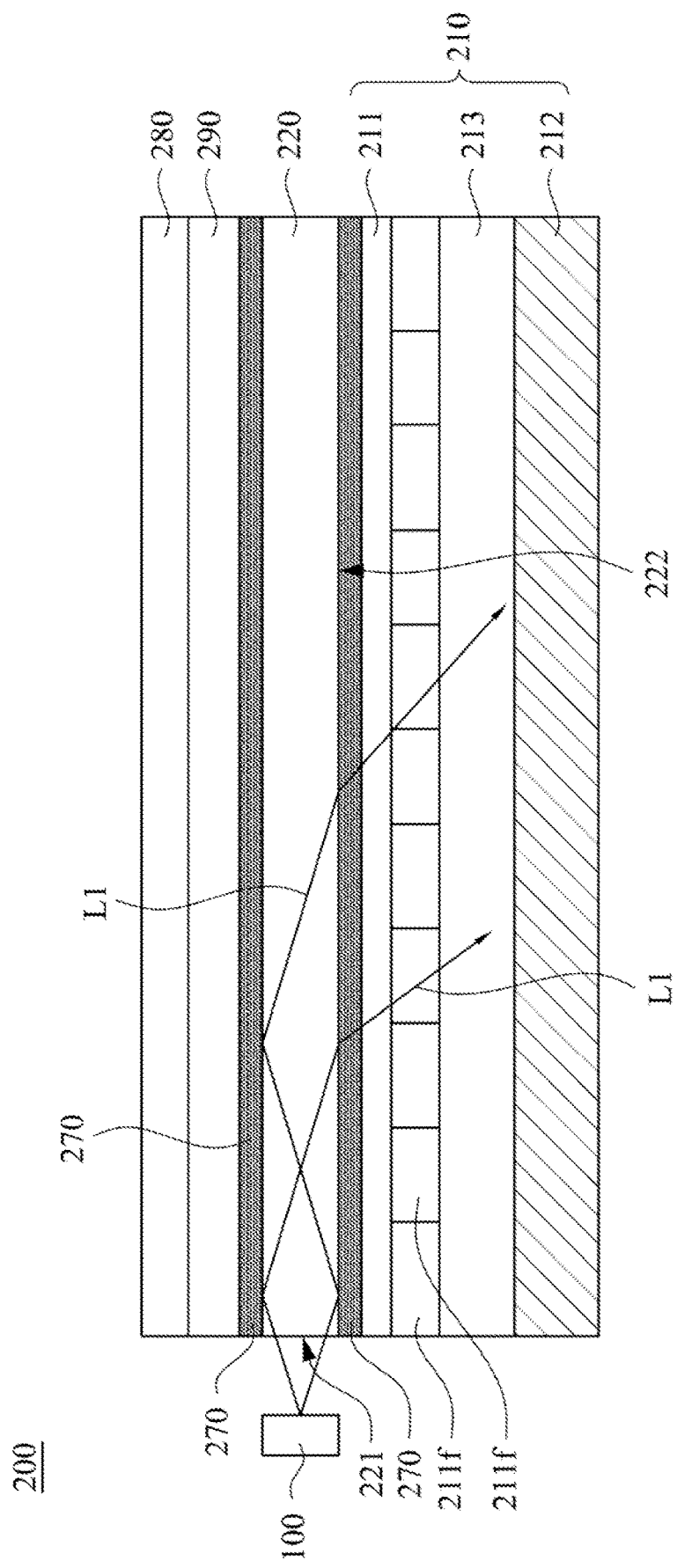

FIG. 1A is a schematic top view of a reflective display according to at least one embodiment of this disclosure, and FIG. 1B is a schematic cross-sectional view taken along a line 1B-1B in FIG. 1A. Referring to FIGS. 1A and 1B, the reflective display 200 includes a light source device 100 and a reflective display panel 210, where the light source device 100 can generate illumination light L1, and the illumination light L1 can enter the reflective display panel 210, so as to help the reflective display 200 to display images.

The reflective display panel 210 includes a color filter substrate 211, an active component array substrate 212 and a display medium layer 213, in which the display medium layer 213 is located between the active component array substrate 212 and the color filter substrate 211. The color filter substrate 211 may have various kinds of color filter layers 211f, which may be a plurality of red filter layers, a plurality of green filter layers and a plurality of blue filter layers, where the color filter layers 211f may be arranged in a matrix. When the illumination light L1 enters the reflective display panel 210, the illumination light L1 will pass through the color filter layers 211f, so as to form red light, green light and blue light.

The active component array substrate 212 has a plurality of active components (not shown) and a plurality of pixel electrodes (not shown), in which the active components are electrically connected to the pixel electrodes, and the active component can be a Thin Film Transistor (TFT). The reflective display panel 210 can be an Electrophoretic Display (EPD) panel, where the display medium layer 213 can include a plurality of microcups and electrophoretic ink contained in the microcups. The active components can control voltage input to the electrodes, so as to generate the electrical field in the display medium layer 213, thereby controlling the electrophoretic ink in the display medium layer 213, so that the reflective display 200 can display images.

The reflective display 200 can further include a light guide plate 220. The light guide plate 220 is disposed on the reflective display panel 210, and the color filter substrate 211 is located between the display medium layer 213 and the light guide plate 220. Taking FIG. 1B for example, the reflective display 200 can further include at least one Optically Clear Adhesive (OCA) 270, where one OCA 270 is located between the light guide plate 220 and the color filter substrate 211, so that the light guide plate 220 can be disposed on and attached to the reflective display panel 210 via the OCA 270. In addition, the light guide plate 220 has a light incident surface 221 and a light emitting surface 222 connected to the light incident surface 221. Taking FIG. 1B for example, the light incident surface 221 may be a side surface of the light guide plate 220, while the light emitting surface 222 may be a bottom surface of the light guide plate 220.

The light source device 100 is disposed on the light incident surface 221, and the light emitting surface 222 faces the reflective display panel 210. When the light source device 100 emits the illumination light L1, the illumination light L1 will be incident to the light incident surface 221, so that the illumination light L1 can enter the insides of the light guide plate 220. Afterwards, the illumination light L1 traveling inside the light guide plate 220 will exit the light emitting surface 222, so that the illumination light L1 can enter the reflective display panel 210, thereby helping the reflective display 200 to display images.

The reflective display 200 can be a touch display and further include a touch panel 290, in which the touch panel 290 is disposed on the light guide plate 220. For example, the reflective display 200 includes two OCAs 270, and both of the OCAs 270 are disposed on two opposite surfaces (including the light emitting surface 222) of the light guide plate 220. One of the OCAs 270 is located between the light guide plate 220 and the touch panel 290, so that the touch panel 290 can be disposed on and attached to the light guide plate 220 via the OCA 270.

The reflective display 200 can further include a cover lens 280 covering the touch panel 290, as shown in FIG. 1B. It is necessary to note that the reflective display 200 can include the touch panel 290 and the cover lens 280 in this embodiment, but the reflective display 200 cannot include the touch panel 290 and the cover lens 280 in other embodiment. In other words, the reflective display 200 can have no touch control function, and the reflective display 200 is not limited to including the touch panel 290 and the cover lens 280.

The light source device 100 includes at least one first white light source 101 and at least one second white light source 102. In the embodiment shown in FIG. 1A, the light source device 100 includes a plurality of first white light sources 101 and a plurality of second white light sources 102. However, in other embodiment, the quantity of the first white light source 101 included by the light source device 100 can be one, and the light source device 100 includes a plurality of second white light sources 102. Alternatively, the quantity of the second white light source 102 included by the light source device 100 can be one, and the light source device 100 includes a plurality of first white light sources 101. Hence, the light source device 100 includes at least one first white light source 101 and at least one second white light source 102, and FIG. 1A does not limit the quantities of both of the first white light source 101 and the second white light source 102.

Any one of both the first white light sources 101 and the second white light sources 102 includes a light emitting component 110. In other words, both of the first white light sources 101 and the second white light sources 102 include a light emitting component 110 apiece. Each of the first white light sources 101 further includes a first fluorescent part 111, and each of the second white light sources 102 includes a second fluorescent part 112. The first fluorescent parts 111 are disposed on a plurality of light emitting components 110 respectively, and the second fluorescent part 112 are disposed one the other light emitting components 110. The light source device 100 includes at least one first white light source 101 and at least one second white light source 102, so that at least one first fluorescent part 111 is disposed on at least one of the light emitting components 110, and at least one second fluorescent part 112 is disposed on at least one of the other light emitting components 110.

The first white light source 101 can emit first white light WL1, whereas the second white light source 102 can emit second white light WL2. The first white light sources 101 and the second white light sources 102 can be arranged in a line, in which the first white light sources 101 and the second white light sources 102 are arrange alternately, so that the first white light WL1 emitted by the first white light sources 101 and the second white light WL2 emitted by the second white light sources 102 can mix uniformly to form the illumination light L1. The illumination light L1 can be incident to a display area A21 of the reflective display panel 210, so as to help the reflective display 200 to display images. In addition, the first white light sources 101 and the second white light sources 102 can be mounted to the same circuit substrate (not shown), and the light source device 100 may be a light bar.

Figure 1C:
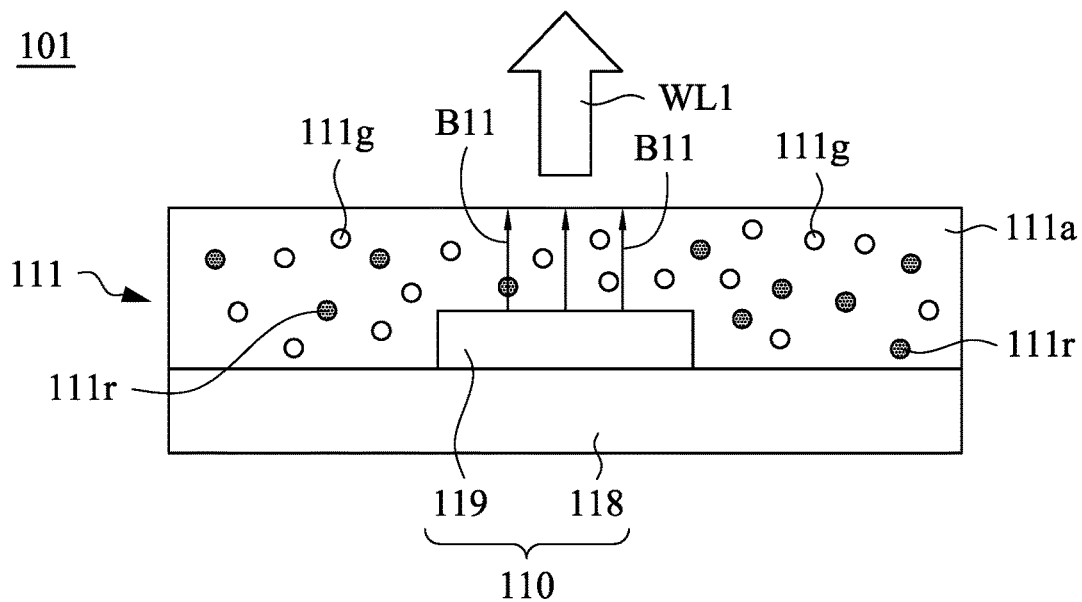
FIG. 1C is a schematic cross-sectional view of the first white light source in FIG. 1A.

FIG. 1C is a schematic cross-sectional view of the first white light source in FIG. 1A. Referring to FIG. 1C, in the same first white light source 101, the light emitting component 110 can include a packaging carrier 118 and at least one light emitting chip 119, in which the light emitting chip 119 is such as a Light Emitting Diode (LED) die, and the light emitting chip 119 can be mounted to the packaging carrier 118 by using wire bonding or flip chip. The first fluorescent part 111 disposed on the light emitting components 110 covers and encapsulates the light emitting chip 119.

The first fluorescent part 111 includes a transparent encapsulant 111a, a first red fluorescent material 111r and a green fluorescent material 111g, in which the first red fluorescent material 111r and the green fluorescent material 111g are distributed in the transparent encapsulant 111a, and the transparent encapsulant 111a can be made of polymeric materials, such as resin. Each of the light emitting components 110 can emit the light B11, which is blue light, for example. Each of the first fluorescent parts 111 can convert the light B11 to first white light WL1 having a first color temperature. In other words, the first white light WL1 is substantially the light B11 which has passed through both the green fluorescent material 111g and the first red fluorescent material 111r.

Figure 1D:
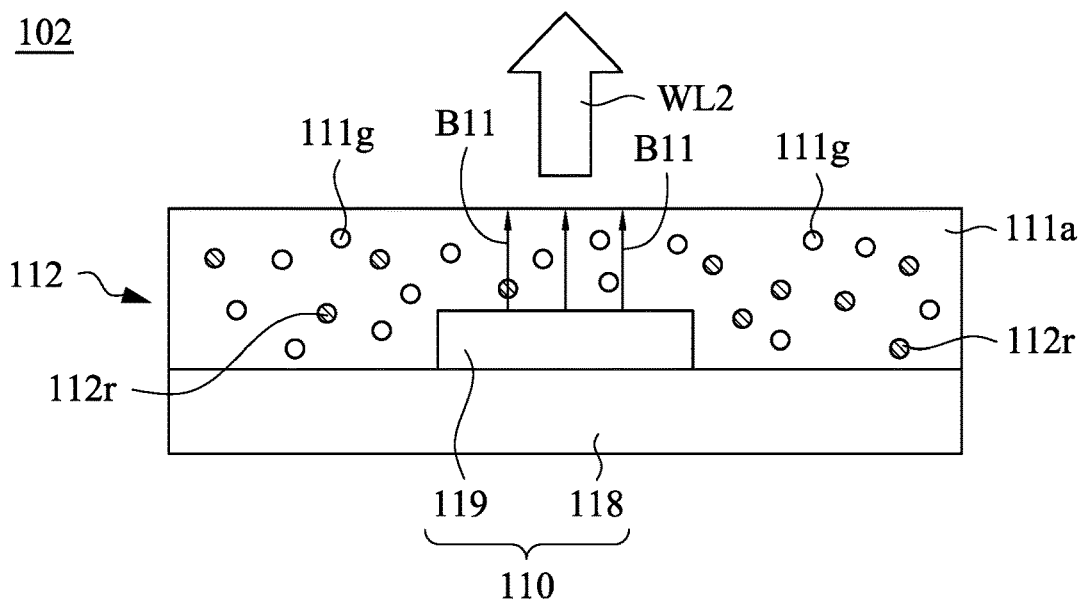
FIG. 1D is a schematic cross-sectional view of the second white light source in FIG. 1A.

FIG. 1D is a schematic cross-sectional view of the second white light source in FIG. 1A. Referring to FIG. 1D, the second white light source 102 is similar to the first white light source 101, where the main difference between the first white light source 101 and the second white light source 102 is that the second fluorescent part 112 included by the second white light source 102 is different from the first fluorescent part 111. Specifically, although the second fluorescent part 112 also includes the transparent encapsulant 111a and the green fluorescent material 111g, the second fluorescent part 112 further includes a second red fluorescent material 112r and does not include any first red fluorescent material 111r, in which the second red fluorescent material 112r is different from the first red fluorescent material 111r.

The second fluorescent part 112 can convert the light B11 to the second white light WL2 having a second color temperature. In other words, the second white light WL2 is substantially the light B11 which has passed through both the green fluorescent material 111g and the second red fluorescent material 112r. The second red fluorescent material 112r is different from the first red fluorescent material 111r, so that the first color temperature is apparently different from the second color temperature, in which a maximum difference between the first color temperature and the second color temperature is greater than or equal to 2000K.

The maximum difference can be equal to a difference between the first color temperature and the second color temperature, in which the first color temperature can be lower than the second color temperature. Moreover, since the first white light WL1 and the second white light WL2 can mix to form the illumination light L1, the illumination light L1 includes the first white light WL1 and the second white light WL2, where the color temperature of the illumination light L1 can range between 4500K and 7000K. For example, the color temperature of the illumination light L1 can be about 6500K.

Figure 2A:
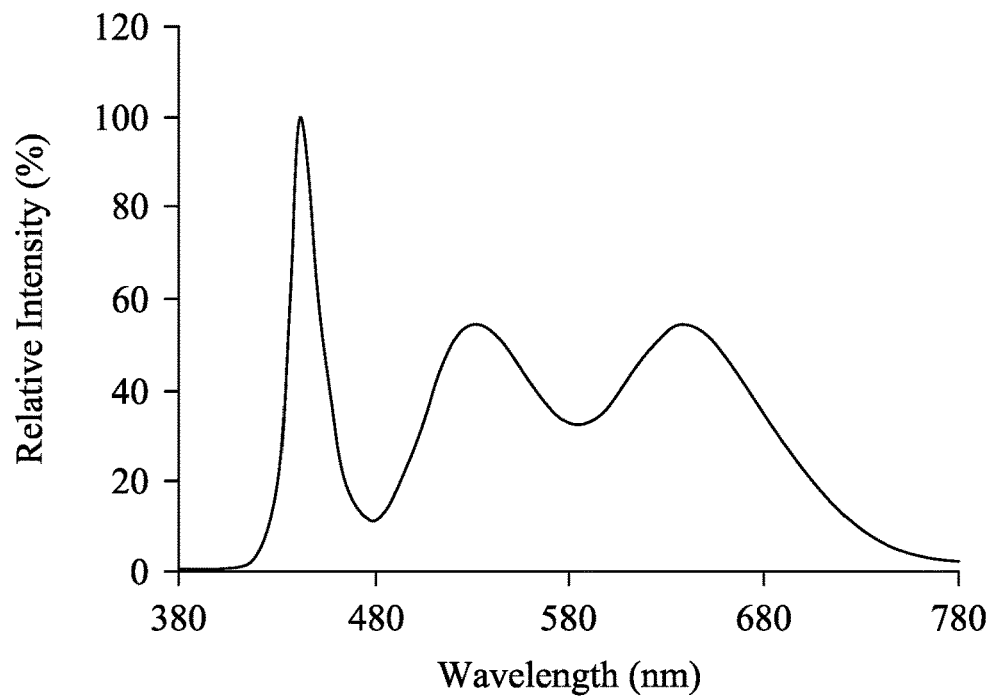
FIG. 2A is an optical spectrum diagram of the first white light in FIG. 1C.
Figure 2B:
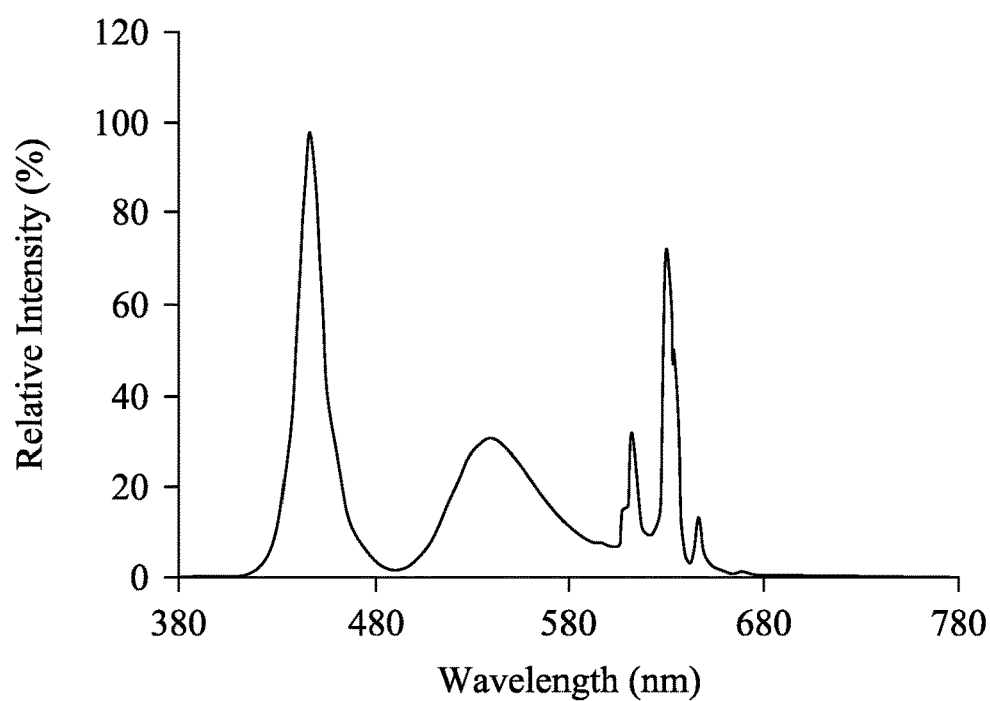
FIG. 2B is an optical spectrum diagram of the second white light in FIG. 1D.

FIG. 2A is an optical spectrum diagram of the first white light in FIG. 1C, and FIG. 2B is an optical spectrum diagram of the second white light in FIG. 1D. Referring to FIGS. 2A and 2B, it can be understood from FIGS. 2A and 2B that the spectra of both the first white light WL1 and the second white light WL2 are apparently different, so that the first color temperature of the first white light WL1 is apparently different from the second color temperature of the second white light WL2. In addition, in the red spectrum range of wavelength above 600 nm, the first white light WL1 shown in FIG. 2A has a wider spectrum, whereas the second white light WL2 shown in FIG. 2B has a narrower spectrum. Hence, the bandwidth of the first red fluorescent material 111r is greater than the bandwidth of the second red fluorescent material 112r, so that the first color temperature of the first white light source 101 is lower than the second color temperature of the second white light source 102.

Figure 2C:
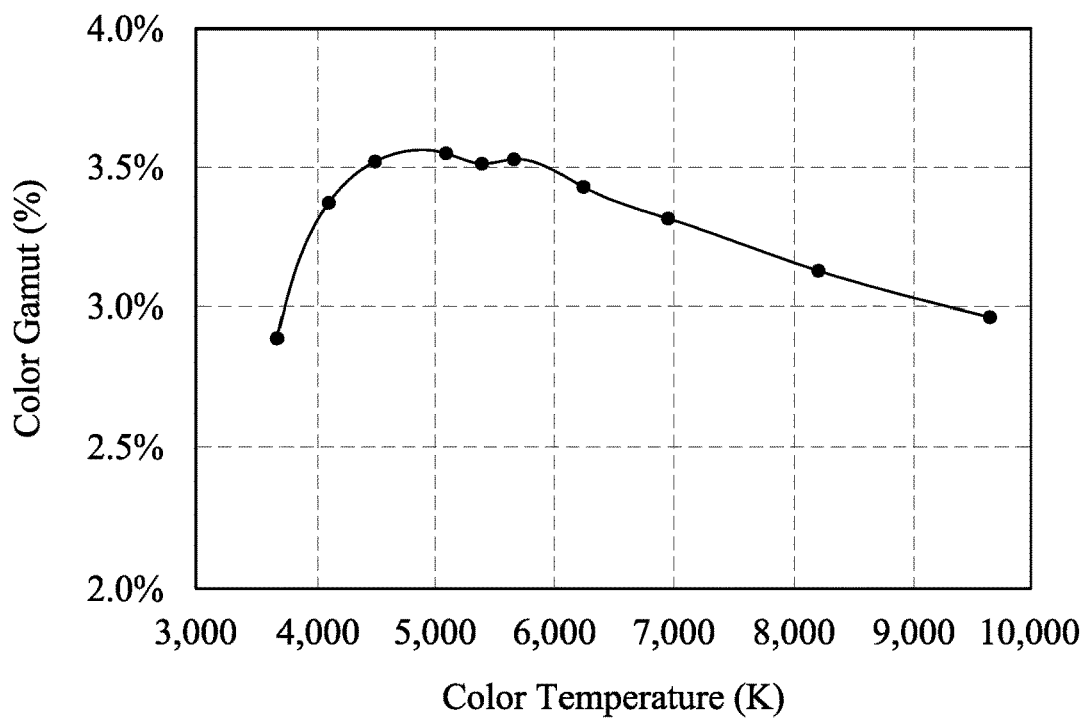
FIG. 2C is a schematic line chart of color gamut versus color temperature in a reflective display according to at least one embodiment of this disclosure.

FIG. 2C is a schematic line chart of color gamut versus color temperature in a reflective display according to at least one embodiment of this disclosure. Referring to FIGS. 1A and 2C, the line shown in FIG. 2C is obtained by measuring the color gamut (i.e., NTSC value) of the reflective display 200, and the measured reflective display 200 includes six first white light sources 101 and seven second white light sources 102, in which the color temperature of the first white light source 101 ranges between 3500K and 4000K, and the color temperature of the second white light source 102 ranges between 9500K and 10000K.

In FIG. 2C, the Y axis is the color gamut obtained by the above measurement, and the X axis is the color temperature of the illumination light L1 emitted from the six first white light sources 101 and the seven second white light sources 102, where the color temperature of the illumination light L1 can be controlled by adjusting the electric current input to the first white light sources 101 and the second white light sources 102, and the color temperature can range between 3700K and 9700K.

Figure 2D:
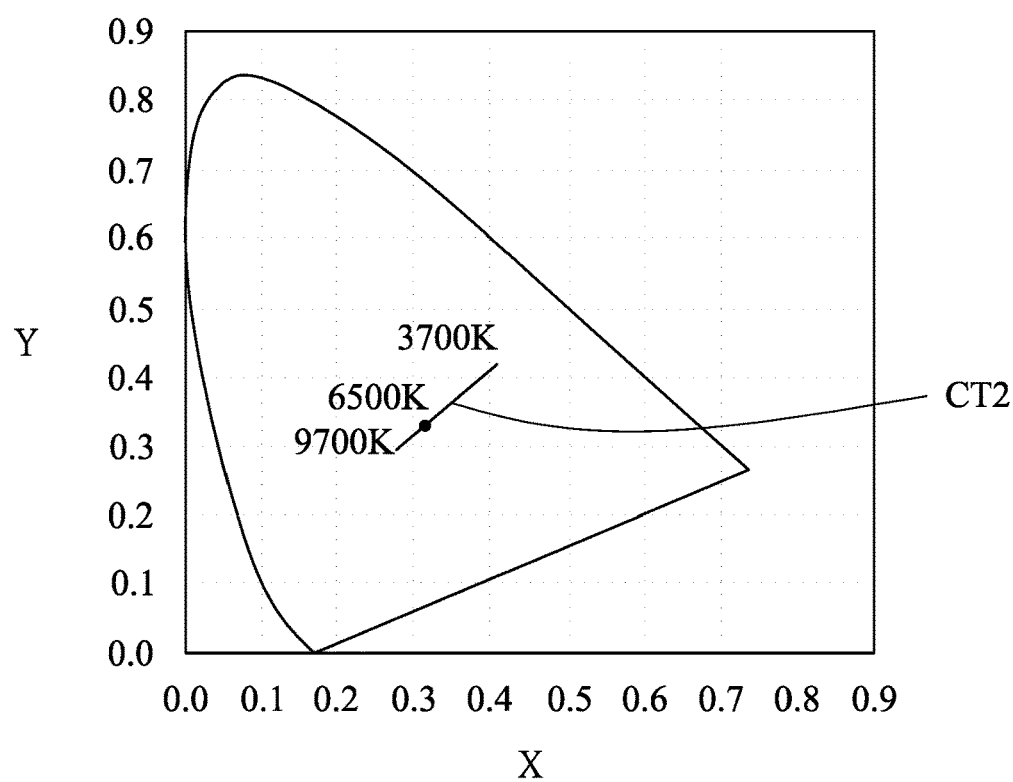
FIG. 2D is a chromaticity diagram marked with a line indicating a color temperature range between 3700K and 9700K.

FIG. 2D is a chromaticity diagram marked with a line indicating a color temperature range between 3700K and 9700K. Referring to FIGS. 2C and 2D, by adjusting the electric current input to the first white light sources 101 and the second white light sources 102, the color temperature of the illumination light L1 emitted from the light source device 100 can be controlled, so that the color temperature of the illumination light L1 can be equal to a color temperature which corresponds to any one of the points on a straight line CT2 in FIG. 2D, such as 6500K, in which two terminal points of the straight line CT2 represent two color temperatures of 3700K and 9700K respectively, that is, the straight line CT2 is equivalent to a line connecting two points which correspond to the color temperatures of 3700K and 9700K respectively.

For example, when there is a 3:5 ratio between the electric current input to the first white light source 101 and the electric current input to the second white light source 102, the illumination light L1 formed by mixing the first white light WL1 and the second white light WL2 has the color temperature of 6500K, in which the color temperature of 6500K is suitable for the use of the reflective display 200. That is, it can help to maintain or improve the image quality of the reflective display 200 by irradiating the reflective display panel 210 with the illumination light L1 having the color temperature of 6500K. Moreover, it can be understood from FIG. 2C that the reflective display 200 can have a better color gamut when the color temperature of the illumination light L1 ranges between 4500K and 6500K.

It is worth mentioning that in addition to adjusting the electric current input to the first white light source 101 and the second white light source 102, the color temperature of the illumination light L1 also can be controlled in other way, so that the illumination light L1 has appropriate color temperature (e.g., 6500K) for the use of the reflective display 200. Specifically, under the condition that the same electric current is input to the first white light sources 101 and the second white light sources 102, at least one appropriate first white light source 101 and at least one appropriate second white light source 102 can be selected for achieving a predetermined color temperature (e.g., 6500K) according to the following three equations:

$$Xc=(X1+X2)/2;$$

$$Yc=(Y1+Y2)/2; \text{ and}$$

$$Zc=(Z1+Z2)/2.$$

The X1, Y1, Z1 and X2, Y2, Z2 and Xc, Yc, Zc are all tristimulus values belonging to the CIE 1931, where X1, Y1, Z1 are tristimulus values obtained by converting the first color temperature, and X2, Y2, Z2 are tristimulus values obtained by converting the second color temperature. Xc, Yc, Zc are tristimulus values obtained by converting the predetermined color temperature (e.g., 6500K). In addition, Y1 and Y2 can be the brightness of both the first white light source 101 and the second white light source 102 respectively.

Under the condition that the predetermined color temperature (i.e., Xc, Yc, Zc) is known, as long as one of the first color temperature (i.e., X1, Y1, Z1) and the second color temperature (i.e., X2, Y2, Z2) is known, the other one can be calculated by the above equations. For example, when the predetermined color temperature (i.e., Xc, Yc, Zc) and the second color temperature (i.e., X2, Y2, Z2) are known, the first color temperature (i.e., X1, Y1, Z1) can be calculated by using the above three equations. Accordingly, the appropriate first white light sources 101 and the appropriate second white light sources 102 can be selected for the light source device 100, so that both the first white light sources 101 and the second white light sources 102 receiving equal electric current can emit the illumination light L1 having the appropriate predetermined color temperature, thereby helping to maintain or improve the image quality of the reflective display 200.

Figure 3A:
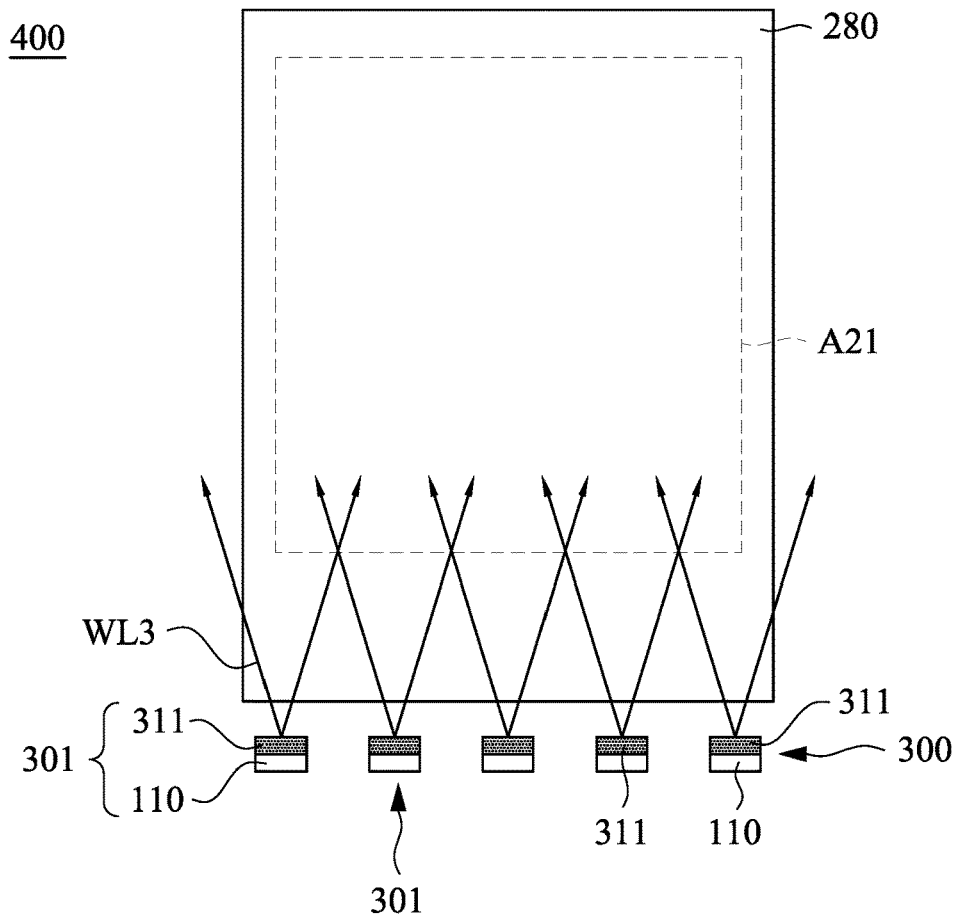
FIG. 3A is a schematic top view of a reflective display according to another embodiment of this disclosure.
Figure 3B:
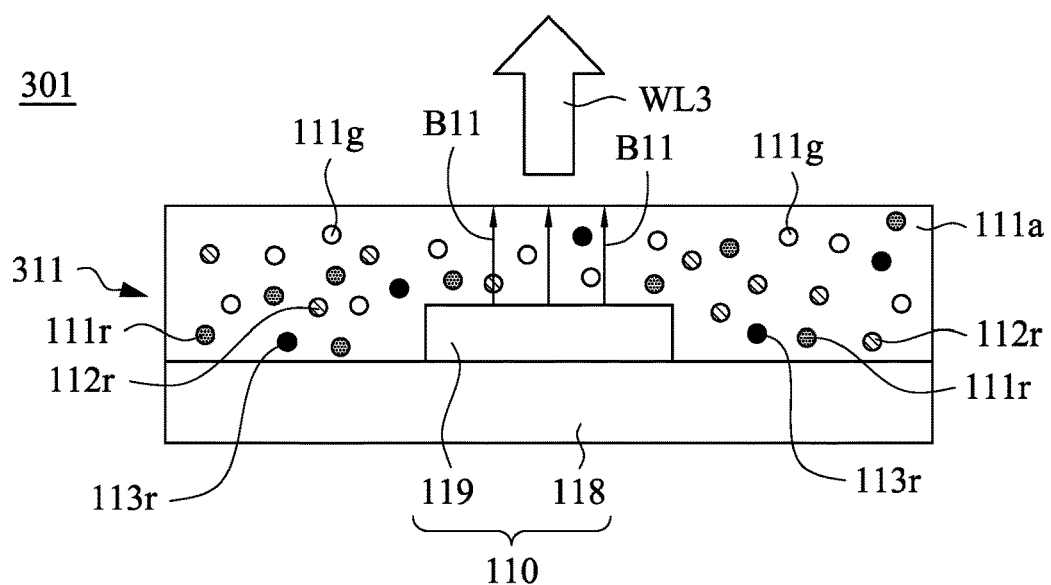
FIG. 3B is a schematic cross-sectional view of the white light source in FIG. 3A.

FIG. 3A is a schematic top view of a reflective display according to another embodiment of this disclosure, and FIG. 3B is a schematic cross-sectional view of the white light source in FIG. 3A. Referring to FIGS. 3A and 3B, the reflective display 400 is similar to the previous reflective display 200. For example, the reflective display 400 has a cross-sectional structure as shown in FIG. 1B and can include the reflective display panel 210, the light guide plate 220, the cover lens 280, the touch panel 290 and the light source device 300.

The light source device 300 includes a plurality of white light sources 301, where each of the white light sources 301 includes a light emitting component 110 and a fluorescent part 311, and the fluorescent part 311 are disposed on the light emitting components 110 respectively. Unlike the first white light source 101 and the second white light source 102, each of the fluorescent parts 311 includes a transparent encapsulant 111a, a green fluorescent material 111g, a first red fluorescent material 111r and a second red fluorescent material 112r, in which the green fluorescent material 111g, the first red fluorescent material 111r and the second red fluorescent material 112r are distributed in the transparent encapsulant 111a. Thus, white light WL3 emitted from the white light sources 301 has the same color temperature substantially, and the illumination light emitted from the light source device 300 also has the color temperature which is the same as that of the white light WL3 substantially, in which the color temperature of the white light WL3 emitted from the white light source 301 can range between 4500K and 7000K.

In this embodiment, each of the fluorescent parts 311 further includes a third red fluorescent material 113r, in which the light B11 has a third color temperature after passing through the green fluorescent material 111g and the third red fluorescent material 113r, and the third color temperature ranges between the first color temperature of the first white light WL1 and the second color temperature of the second white light WL2. Hence, among the first color temperature, the second color temperature, and the third color temperature, the maximum difference between the highest color temperature and the lowest color temperature is greater than or equal to 2000K.

Although the fluorescent part 311 in this embodiment includes three kinds of red fluorescent materials: the first red fluorescent material 111r, the second red fluorescent material 112r and the third red fluorescent material 113r, in other embodiment, the fluorescent part 311 can include only two kinds of red fluorescent materials, i.e., the first red fluorescent material 111r and the second red fluorescent material 112r. Hence, the fluorescent part 311 also can include only two kinds of red fluorescent materials, and FIG. 3B does not limit the quantity of the kind of the red fluorescent material included by the fluorescent part 311.

It is worth mentioning that when the fluorescent part 311 includes three or more than three various kinds of red fluorescent materials, the light B11 and the red fluorescent materials individually combined with the green fluorescent material 111g can generate various kinds of white lights having the highest color temperature and the lowest color temperature, where the maximum difference between the highest color temperature (e.g., the second color temperature) and the lowest color temperature (e.g., the first color temperature) can be greater than or equal to 2000K, so that the light source device 300 can generate illumination light having an appropriate color temperature, so as to help to maintain or improve the image quality of the reflective display 400.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A reflective display, comprising:
   a reflective display panel, comprising:
      an active component array substrate;
      a color filter substrate; and
      a display medium layer, located between the active component array substrate and the color filter substrate;
   a light guide plate, disposed on the reflective display panel and having a light incident surface and a light emitting surface connected to the light incident surface,
   wherein the color filter substrate is located between the display medium layer and the light guide plate;
   a light source device, used to generate an illumination light, wherein the illumination light enters the reflective display panel, and the light source device comprises:
   a plurality of light emitting components, wherein each of the light emitting components is used to emit a light;
   at least one first fluorescent part, disposed on at least one of the light emitting components and used for converting the light to a first white light, wherein the first white light has a first color temperature; and
   at least one second fluorescent part, disposed on at least one of the light emitting components and used for converting the light to a second white light, wherein the second white light has a second color temperature, and the illumination light comprises the first white light and the second white light, wherein a maximum difference between the first color temperature and the second color temperature is greater than or equal to 2000K;
   wherein the light source device is disposed on the light incident surface, and the light emitting surface faces the reflective display panel.

2. The reflective display of claim 1, wherein the illumination light enters the light incident surface and exits the light emitting surface.

3. The reflective display of claim 1, wherein each of the first fluorescent parts and each of the second fluorescent parts comprising a green fluorescent material, a first red fluorescent material, and a second red fluorescent material, wherein the light has a first color temperature after passing through the green fluorescent material and the first red fluorescent material, and the light has a second color temperature after passing through the green fluorescent material and the second red fluorescent material.

4. The reflective display of claim 3, wherein each of the first fluorescent parts and each of the second further comprises:
   a third red fluorescent material, wherein the light has a third color temperature after passing through the green fluorescent material and the third red fluorescent material, and the third color temperature ranges between the first color temperature and the second color temperature.

5. The reflective display of claim 1, wherein both the first color temperature and the second color temperature comply with the following three equations when an electric current input to each of the light emitting components is the same:

$Xc=(X1+X2)/2;$ $Yc=(Y1+Y2)/2;$ and $Zc=(Z1+Z2)/2.$ wherein X1, Y1, Z1 are tristimulus values obtained by converting the first color temperature, X2, Y2, Z2 are tristimulus values obtained by converting the second color temperature, and Xc, Yc, Zc are tristimulus values obtained by converting a predetermined color temperature.

6. The reflective display of claim 1, wherein the at least one first fluorescent part comprises a first red fluorescent material, and the at least one second fluorescent part comprises a second red fluorescent material, wherein a bandwidth of the first red fluorescent material is greater than a bandwidth of the second red fluorescent material.

7. The reflective display of claim 1, wherein the at least one first fluorescent part and the at least one second fluorescent part further comprise a green fluorescent material apiece.

8. The reflective display of claim 1, wherein a color temperature of the illumination light ranges between 4500K and 7000K.

9. The reflective display of claim 1, wherein the predetermined color temperature is 6500K.

* * * * *